US008862562B2

(12) United States Patent  (10) Patent No.: US 8,862,562 B2
Hibino et al.  (45) Date of Patent: Oct. 14, 2014

(54) FILE MANAGEMENT APPARATUS, METHOD, AND PROGRAM PRODUCT THEREOF FOR SENDING A FILE-SAVING RELATED NOTICE THAT INDICATES THE CONTENTS OF THE SAVED FILE

(75) Inventors: Takeshi Hibino, Toyokawa (JP); Kazuyuki Kawabata, Toyokawa (JP); Hideyuki Hashimoto, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 406 days.

(21) Appl. No.: 11/012,183

(22) Filed: Dec. 16, 2004

(65) Prior Publication Data

US 2006/0047730 A1  Mar. 2, 2006

(30) Foreign Application Priority Data

Aug. 25, 2004 (JP) .................................. 2004-244854

(51) Int. Cl.
  *G06F 17/30* (2006.01)
(52) U.S. Cl.
  CPC ............................... *G06F 17/30067* (2013.01)
  USPC .......................................... 707/705; 707/692
(58) Field of Classification Search
  CPC .................... G06F 17/30067; Y10S 707/99931
  USPC .................................. 707/663, 689, 692, 705
  See application file for complete search history.

(56) References Cited

U.S. PATENT DOCUMENTS

| | | | |
|---|---|---|---|
| 5,617,566 A * | 4/1997 | Malcolm ........................ | 707/204 |
| 6,266,162 B1 * | 7/2001 | Okamura et al. ............. | 358/468 |
| 6,335,742 B1 * | 1/2002 | Takemoto ...................... | 715/781 |
| 6,335,746 B1 * | 1/2002 | Enokida et al. ............... | 715/839 |

(Continued)

FOREIGN PATENT DOCUMENTS

| | | |
|---|---|---|
| JP | 9-6657 | 1/1997 |
| JP | 11-177743 | 7/1999 |

(Continued)

OTHER PUBLICATIONS

Cockburn et al. (WebView: A Graphical Aid for Revisiting Web Pages, Department of Computer Science, University of Canterbury in in Proceedings of the OZCHI'99 Australian Conference on Human Computer Interaction, (Nov. 28-30, Wagga Wagga Australia).*

(Continued)

*Primary Examiner* — Cheryl Lewis
(74) *Attorney, Agent, or Firm* — Buchanan Ingersoll & Rooney PC (57) ABSTRACT

A file management apparatus, file management method, and file management program product are provided in which a user who receives a file-saving related notice from a system can easily grasp the contents of the notified file. Accordingly, a designated notice destination that the end of a save period of a file recorded in a file saving apparatus is provided. The apparatus includes a save-period counter, a save-period monitoring section for monitoring an end of a save period of each file basing on timing by the save-period counter, an attachment-file making section for making a partial file composed of a part of file contents, a notice transmitting section for notifying a notice destination of a fact that there is a file at the end of a save period, and a notice-file making section for attaching a partial file of the file to the notice of the notice transmitting section.

22 Claims, 11 Drawing Sheets

(56) References Cited

U.S. PATENT DOCUMENTS

| | | | |
|---|---|---|---|
| 6,446,091 B1* | 9/2002 | Noren et al. | 707/202 |
| 6,724,974 B2* | 4/2004 | Naruto et al. | 386/46 |
| 7,535,591 B2* | 5/2009 | Kujirai | 358/1.16 |
| 2002/0000998 A1* | 1/2002 | Scott et al. | 345/667 |
| 2002/0033960 A1* | 3/2002 | Kazami | 358/1.14 |
| 2002/0081039 A1* | 6/2002 | Funahashi | 382/305 |
| 2002/0087602 A1* | 7/2002 | Masuda et al. | 707/515 |
| 2003/0123078 A1* | 7/2003 | Kazami | 358/1.14 |
| 2003/0163552 A1 | 8/2003 | Savitzky et al. | |
| 2003/0172094 A1* | 9/2003 | Lauria et al. | 707/206 |
| 2005/0254080 A1* | 11/2005 | Kim | 358/1.13 |

FOREIGN PATENT DOCUMENTS

| | | |
|---|---|---|
| JP | 2003-132002 | 5/2003 |
| JP | 2003-216467 | 7/2003 |
| JP | 2003-256259 | 9/2003 |
| JP | 2003-319125 A | 11/2003 |
| JP | 2004-78331 | 3/2004 |
| JP | 2004-206345 | 7/2004 |

OTHER PUBLICATIONS

Cockburn et al. (WebView: A Graphical Aid for Revisiting Web Pages, Department of Computer Science, University of Canterbury in in Proceedings of the OZCHI'99 Australian Conference on Human Computer Interaction, (Nov. 28-30, Wagga Wagga Australia), hereinafter "Cockburn".*

Japanese Decision to Grant Patent, mailed Aug. 19, 2008, directed to counterpart Japanese Patent Application No. 2004-244854; 6 pages.

Notification of Reason(s) for Refusal directed to JP2004-244854, dated Jan. 8, 2008.

* cited by examiner

|  | | CANCEL | OK |
|---|---|---|---|

DIFFERENT SAVE PERIOD CAN BE SET DEPENDING ON VOLUME OF FILE TO BE SAVED.

| FILE VOLUME | | SAVE PERIOD | |
|---|---|---|---|
| 10 | kB OR LARGER : | 30 | DAYS |
| 500 | kB OR LARGER : | 15 | DAYS |
|  | kB OR LARGER : |  | DAYS |
|  | kB OR LARGER : |  | DAYS |

FIG. 13

|  | CANCEL | OK |
|---|---|---|

MAXIMUM VOLUME OF FILE TO BE ATTACHED TO A PERIOD NOTICE CAN BE SET.

[        ] Byte

FIG. 14

| | |
|---|---|
| From | fileagent@ABCcompany |
| To | user12345@ABCcompany |
| Cc | |
| Subject | ADVANCE NOTICE OF AUTOMATIC FILE DELETION |

TO:user12345

THIS IS AGENT OF FILE-SYSTEM ADMINISTRATOR.

FILES LISTED BELOW ARE TO BE DELETED.
YOU CAN CHECK CONTENTS OF THE FILES BY OPENING ATTACHMENT FILES.

IN CASE EXTENDING SAVE PERIODS, ACCESS TO URL BELOW OR RE-SET SAVE PERIOD WITH MAIN SYSTEM BEFORE CURRENT EFFECTIVE SAVE PERIOD TERMINATES.

http://mfp/file/user12345

---

FILES OBJECT OF DELETION:3

| [FILE NAME] | [EFFECTIVE PERIOD] | [ATTACHMENT FILE] |
|---|---|---|
| file1.doc | 2004/12/14 | file1_1.doc |
| file2.pdf | 2004/12/13 | file2_1.pdf |
| file3.tif | 2004/12/14 | file3_1.tif |

FIG. 15

FILE MANAGEMENT APPARATUS, METHOD, AND PROGRAM PRODUCT THEREOF FOR SENDING A FILE-SAVING RELATED NOTICE THAT INDICATES THE CONTENTS OF THE SAVED FILE

This application is based on Application No. 2004-244854 filed in Japan, contents of which are hereby incorporated by reference.

BACKGROUND OF THE INVENTION

1. Field of the Invention

The present invention relates to a file management apparatus, file management method, and file management program product for managing files saved in a recoding apparatus. More particularly, it relates to a file management apparatus, file management method, and file management program product for notifying a user who has saved a file that the end of a file-save period comes.

2. Description of Related Art

There has conventionally been system equipped with network connected to plural terminals, a recording apparatus, an output apparatus, and the like. Such system is capable of saving files and the like transmitted from respective terminals in a recording apparatus of the network. Alternatively, it is capable of saving files in an output apparatus such as a high-performance printer temporarily. Generally, it is not preferable that the number of files recorded in a memory apparatus and the like becomes too large or appropriate file renewal is not made adequately. Therefore, a file-save period is set for each file to be saved. When end of a file-save period comes near, the system notifies a user or an administrator of near-coming end of the period.

For example, JP Laid-open Patent Publication No. 2003-216467 discloses document management system that registers a save period for each document which has been saved. When a notice concerning near-coming end of a save-period is required, the system notifies a registrar and an examiner involved in the saved document of the near-coming end of the period. The system manages multiple kinds of periods of files unifiedly. What is more, even though a document maker does not input a save period, near-coming end is notified in accordance with a folder in which the document is saved. Furthermore, JP Laid-open Patent Publication No. 11-177743 discloses an image input/output apparatus which is capable of temporarily saving image data obtained by scanning. In case the saved data has not been picked out within a designated period, the image input/output apparatus notifies designated user(s) of the fact of it. According to the Publication No. 11-177743, this apparatus can prevent a user from forgetting to pick out image data.

In both of the above-mentioned cited references, a user is notified of near-coming end of a save-period before automatic deletion for file management. Such advance notice generally includes a file name, a save period, and the like. However, a user or an administrator who is notified cannot always recollect contents of document data or image data from the notified file name instantly. For example, in case a user gives a file a temporary name for temporary file saving, the user may not be able to recollect the temporary name when notified. Also, in case plural data are saved with similar names, there may arise a fear that a user who is notified cannot recollect contents of data exactly from a notified file name.

In such a case, a user has to open the file so that he/she can make sure whether or not the file is allowed to be deleted automatically. Particularly, in case it is image data and the like scanned by an image input/output apparatus, a user may need to check contents of the image data with the image input/output apparatus for making sure. Furthermore, checking data contents with a user's personal computer is sometimes troublesome procedurally. Furthermore, there has been a problem that a user checks a wrong file though he/she means to check a target file.

SUMMARY OF THE INVENTION

The present invention has been made in order to solve the foregoing problem which the above mentioned conventional file management technology has had. It is an object of the present invention to provide a file management apparatus, file management method, and file management program product with which a user who receives a file-saving related notice from system can readily and accurately grasp contents of the notified file.

According to a first aspect of the present invention, there is provided a file management apparatus which manages files recorded in a recording apparatus, comprising: a timer section; a save-period monitoring section which monitors coming of end of a save period for each file in accordance with timing by the timer section; a partial-file making section which makes a partial file composed of partial contents of a file; a notifying section which notifies a notice destination of a fact that there is a file of which save period comes; and a partial-file attaching section which attaches a partial file of the file to a notice by the notifying section.

According to the first aspect of the present invention, the save-period monitoring section monitors coming of end of a save-period for each file recorded in the recording apparatus. Furthermore, the notifying section notifies coming of end of a save period of a subject file. A partial file made by the partial-file making section is attached to a notice made by notifying section. Since the partial file is a part of the original file, a user can readily recall and recognize gist of the original file upon looking at the partial file. Therefore, the user can accurately grasp which file's save period is coming upon looking at a partial file attached to a notice. There is thus realized a file management apparatus which makes it possible for a user who receives a notice of save-period termination from system to identify a file linked to the notice readily and accurately.

According to the second aspect of the present invention, there is also provided file management method for managing files comprising: a save period checking step for checking whether or not end of a save period comes with respect to a file which has been recorded in a recording apparatus and of which save period has been set; a partial-file making step for making a partial file composed of partial contents of a file of which end of save period comes; and a notifying step for notifying a notice destination of a fact that there is a file of which save period is coming and for sending a partial file of the file to the notice destination.

According to the third aspect of the present invention, there is also provided a file management program product which makes a computer execute following steps: a save period checking step for checking whether or not end of a save period comes with respect to a file which has been recorded in a recording apparatus and of which save period has been set; a partial-file making step for making a partial file composed of partial contents of a file of which end of save period comes; and a notifying step for notifying a notice destination of a fact that there is a file of which save period terminates is coming and for sending a partial file of the file to the notice destination.

BRIEF DESCRIPTION OF DRAWINGS

For a better understanding of the present invention, reference is made to the following detailed description of the invention, just in conjunction with the accompanying drawings in which.

DETAILED DESCRIPTION OF PREFERRED EMBODIMENTS

There will be described a preferred embodiment in detail by referring to drawings. In this embodiment, the present invention is applied to a file management apparatus which manages saving of files recorded in a recording apparatus connected to network.

Figure 1:
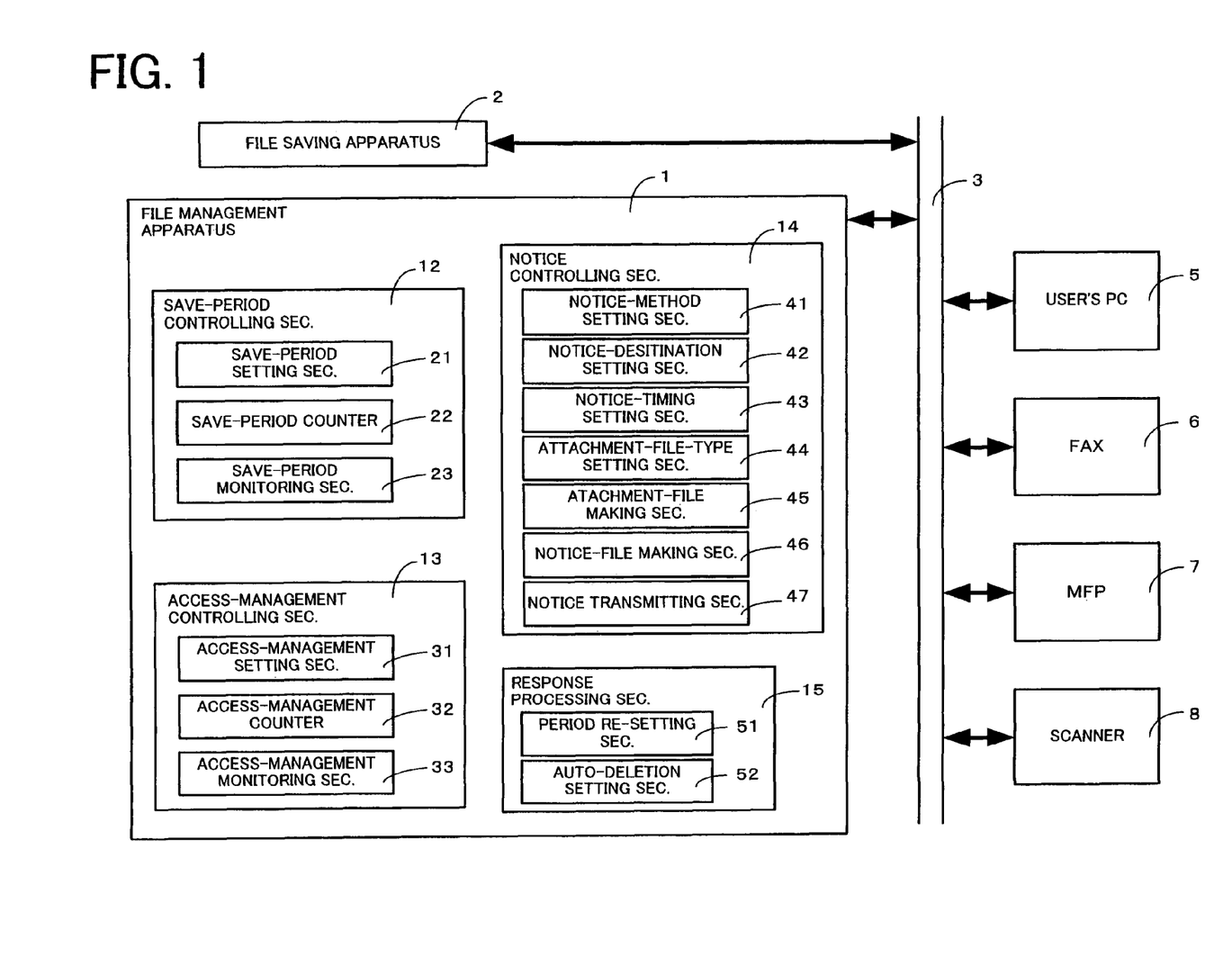
FIG. 1 is a block diagram showing schematic structure of system incorporating a file management apparatus directed to a present embodiment.

As shown in FIG. 1, a file management apparatus 1 of this embodiment is connected to network 3 together with a file saving apparatus 2 which saves files. A user's personal computer 5, a fax 6, a multi-function printer (MFP) 7, a scanner 8, and the like, are also connected to the network 3. They may be not connected to the network 3 or a plurality of each of them may be connected thereto. The file saving apparatus 2 is a recording apparatus shared by components of the system. Each user can save a document file, an image file, and the like in the file saving apparatus 2. A file saved by a user is recorded in the file saving apparatus 2 with various information such as a file name, a name of person who has saved the file, and a date saved.

The file management apparatus 1 conducts management of files saved in the file saving apparatus 2. That is, when a file is saved in the file saving apparatus 2, the file management apparatus 1 sets a save-period for the file. The save-period is set by the user or set by using a default value. The file management apparatus 1 notifies a user of near-coming end of a save-period for each file. The user who receives the notice determines whether or not to permit automatic deletion of the file. The user can avoid automatic deletion of the file by taking a save-period-extension procedure.

The file management apparatus 1 comprises a save-period controlling section 12, an access-management controlling section 13, a notice controlling section 14, and a response processing section 15. The save-period controlling section 12 contains a save-period setting section 21, a save-period counter 22, and a save period monitoring section 23. The access-management controlling section 13 includes an access-management setting section 31, an access-management counter 32, and an access-management monitoring section 33. The notice controlling section 14 comprises a notice-method setting section 41, a notice-destination setting section 42, a notice-timing setting section 43, an attachment-file-type setting section 44, an attachment-file making section 45, a notice-file making section 46, and a notice transmitting section 47. The response processing section 15 contains a period re-setting section 51 and an automatic-deletion setting section 52.

Save-periods of files can be set with various ways. In this embodiment, setting method of save-period can be selected from time setting such as date setting and access-frequency-related setting. In case a save-period of a file is set with a time period such as date and the like, the save-period is under control of the save-period controlling section 12. The save-period controlling section 12 is in charge of setting processing and monitoring processing of a save-period with respect to each file. The save-period setting section 21 sets a save-period of each file. The save-period counter 22 counts days left until end of a save-period. The save-period monitoring section 23 monitors if a save-period comes.

In case a save-period of a file is set basing on sate of access to the file, the save-period is under control of the access-management controlling section 13. The access-management controlling section 13 is in charge of access-restriction-setting processing and monitoring processing with respect to each file. For example, access times, access frequency, time past since last access, and the like are used as criteria of access restriction. The access-management setting section 31 sets management method and a limitation value of each file. The access-management counter 32 counts an access-management value set by the access-management setting section 31. The access-management monitoring section 33 monitors if access state reaches its limitation value set by the access-management setting section 31. The details of access management will be described later.

The notice controlling section 14 is in charge of notice processing for a user. Therefore, notice method, notice destination, notice timing, and the like can be set. The notice-method setting section 41 sets notice method. For example, a user can select notice method from e-mail, fax, FTP (File Transfer Protocol), internet fax, and the like. The notice-destination setting section 42 sets notice destination(s). A save-period notice may be set and addressed to a user who has saved a file but also to the user's supervisor and a system administrator. The notice-timing setting section 43 sets notice timing, such as how many days before termination of a save-period a notice is to be transmitted.

The notice controlling section 14 notifies notice destination(s) of end of a save-period when designated notice timing comes. Then, a partial file of the subject case is attached to the notice file. A type of attachment file is set by the attachment-file-type setting section 44. For example, an attachment file type is selected from one of pages included in the subject file, preview image(s) of the file, thumbnail image(s) of the file, and the like. When a save-period notice is transmitted, an attachment file is made by the attachment-file making section 45 in accordance with the setting by attachment-file-type setting section 44. Further on, a notice file with the attachment file is made by the notice-file making section 46. The notice file made there is transmitted to notice destination(s) by the notice transmitting section 47.

A user or the like who receives the notice determines how to handle the file. As user's choices, a user accepts automatic deletion, sets an extension of the save period, and takes a copy of the file data and save it in the user's personal computer, for example. The user responses and tells the file management apparatus 1 his/her choice. The response processing section 15 conducts appropriate processing in accordance with user's response. For example, in case re-setting of the save period is chosen, the period re-setting section 51 conducts period re-setting processing. In case automatic deletion is chosen, the automatic-deletion setting section 52 conducts automatic deletion processing.

Here will be described examples of files a user saves in the file saving apparatus 2. There are common reference files saved in a folder for common files, in a common mailbox, and in a bulletin board, for example. As another example, there are image data and the like scanned by the MFP 7, the scanner 8 and the like and temporarily saved in a recording apparatus built in the MFP 7 and the scanner 8. There may be a case that image data the FAX 6 has received is saved.

Figure 2:
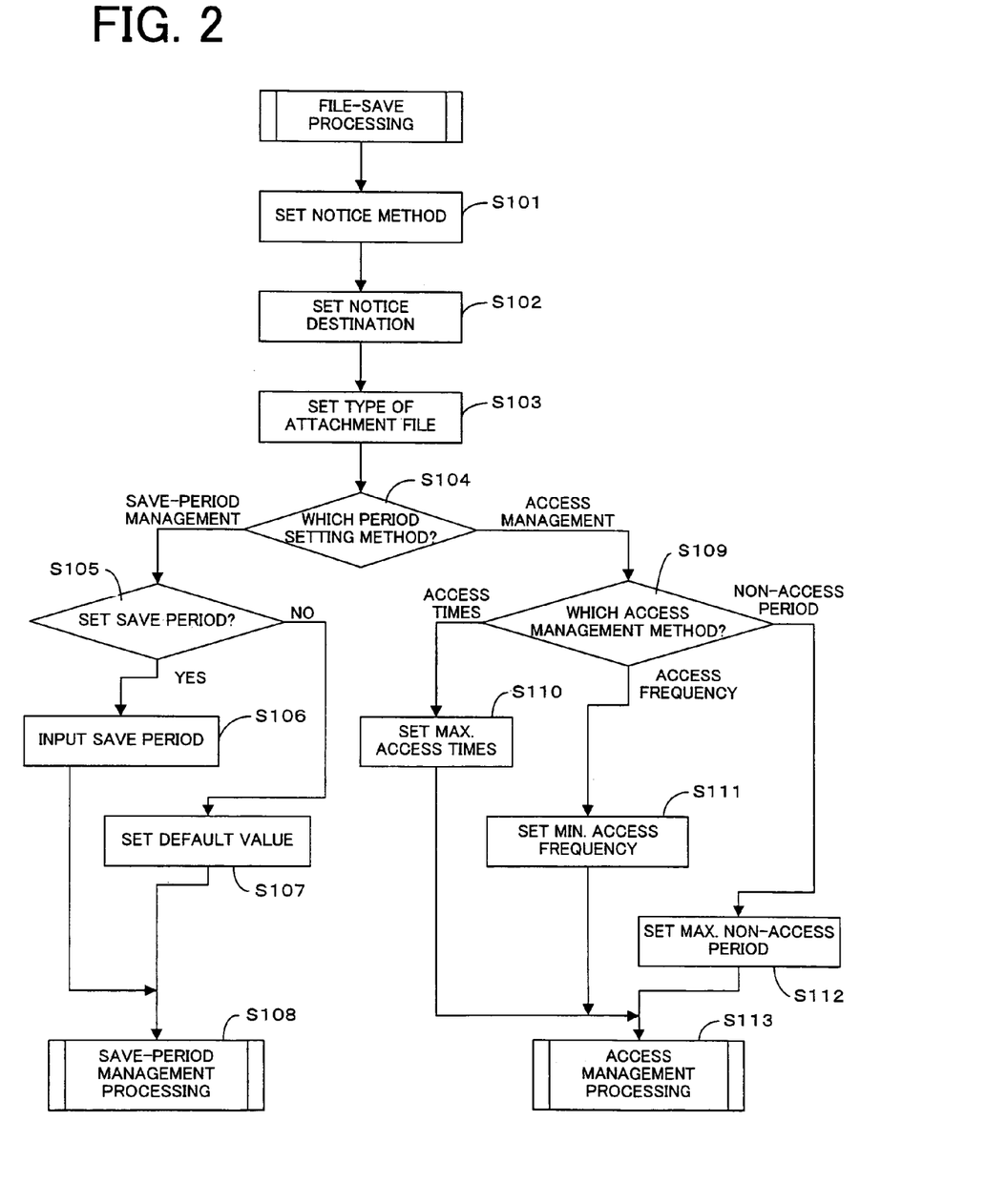
FIG. 2 is a flowchart showing file saving processing by the file management apparatus.
Figure 3:
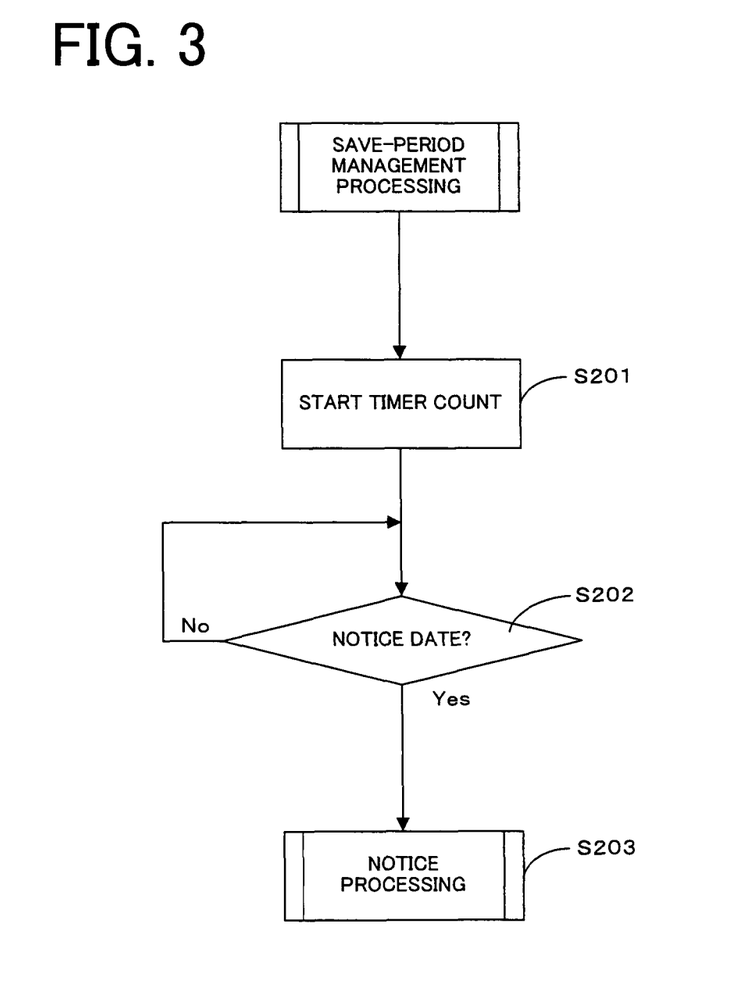
FIG. 3 is a flowchart showing save-period management processing.
Figure 4:
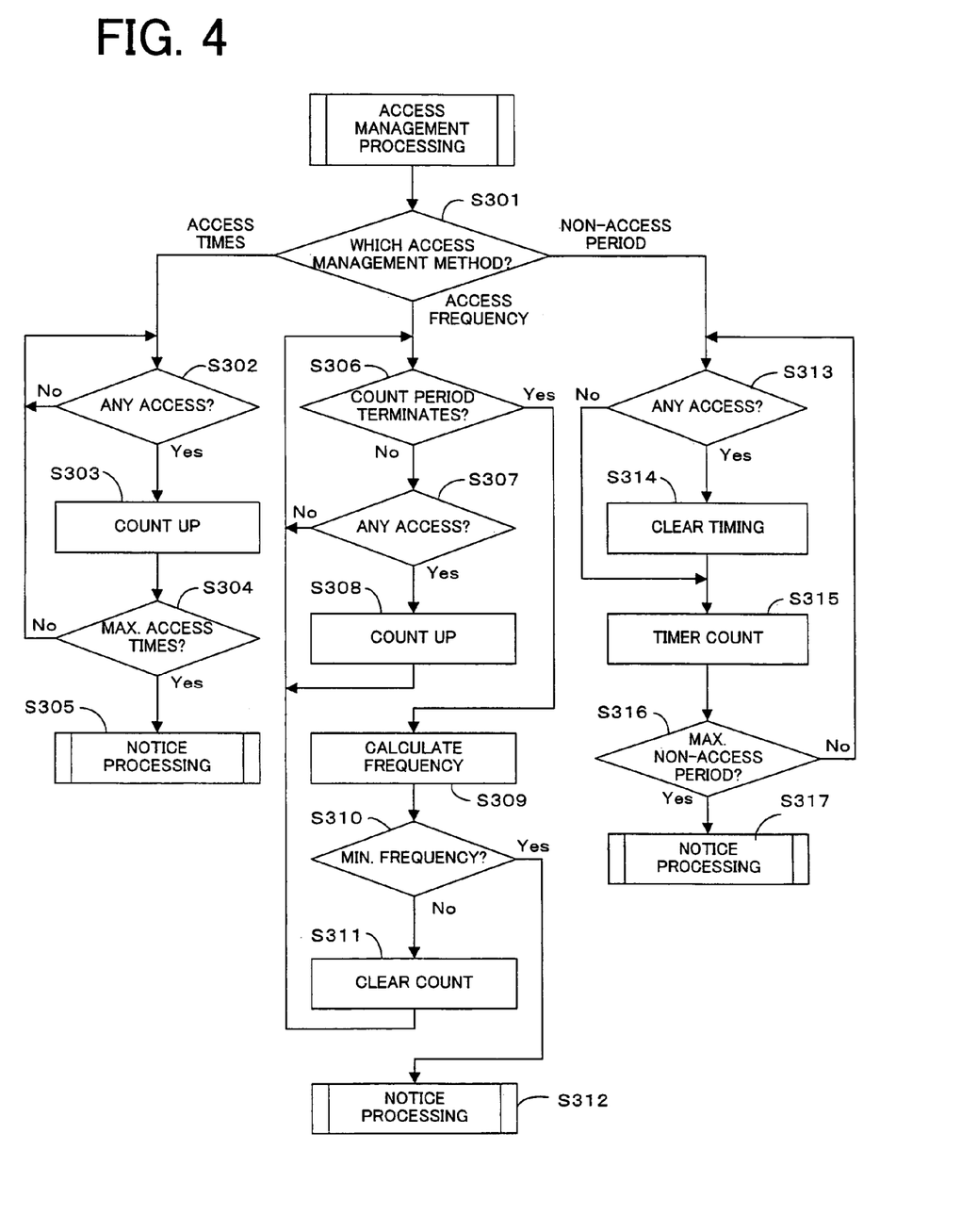
FIG. 4 is a flowchart showing access management processing.
Figure 5:
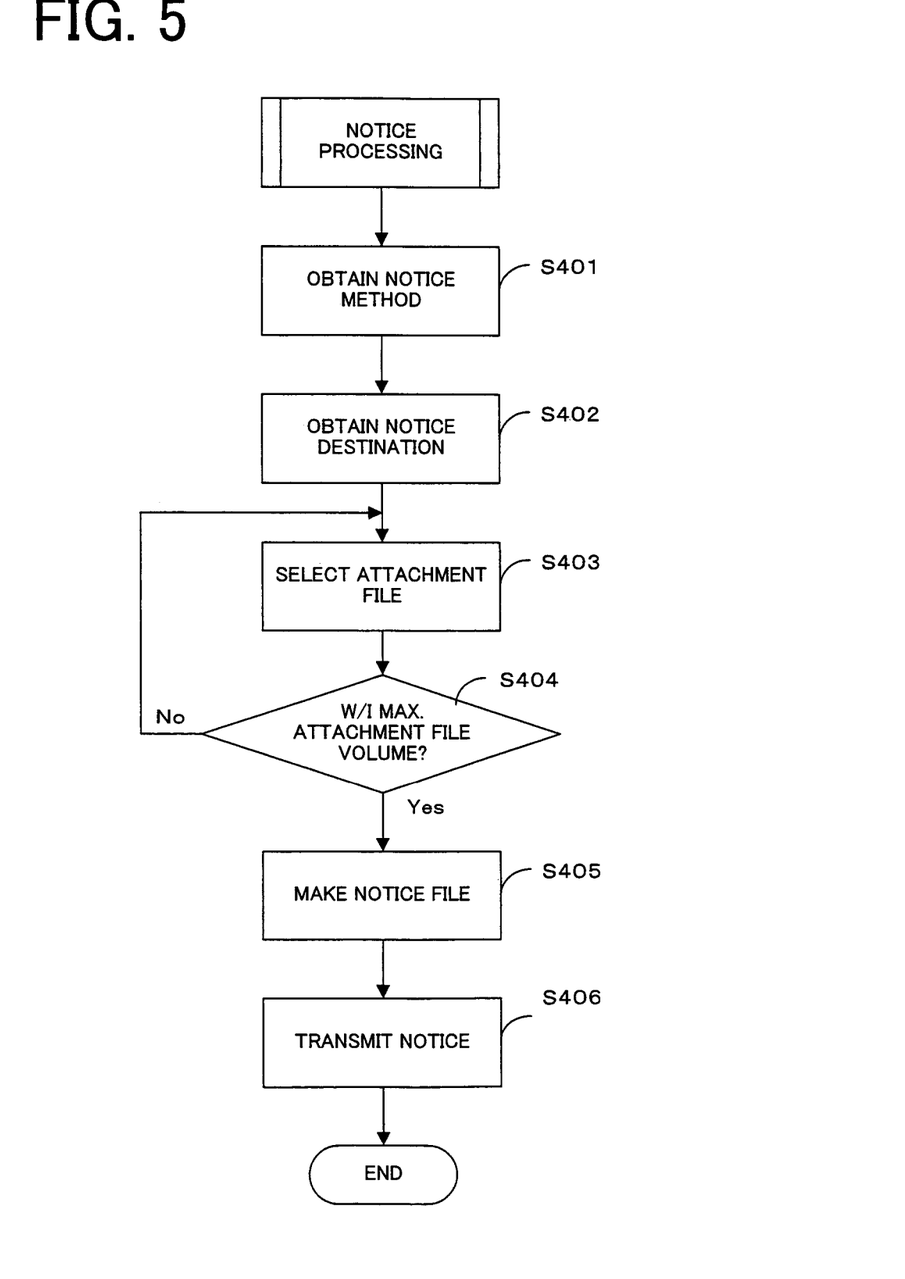
FIG. 5 is a flowchart showing notice processing.

Next, there will be described file management processing by the file management apparatus 1 by referring to FIG. 2 through FIG. 5. FIG. 2 is a flowchart illustrating file-save processing which allows a user to set various procedural matters at the time of saving a file. FIG. 3 is a flowchart illustrating file management processing for a file for which a save-period is set. FIG. 4 is a flowchart illustrating file management processing for a file for which access management is set. FIG. 5 is a flowchart illustrating notice processing for notifying a user of coming of a save-period.

Figure 6:
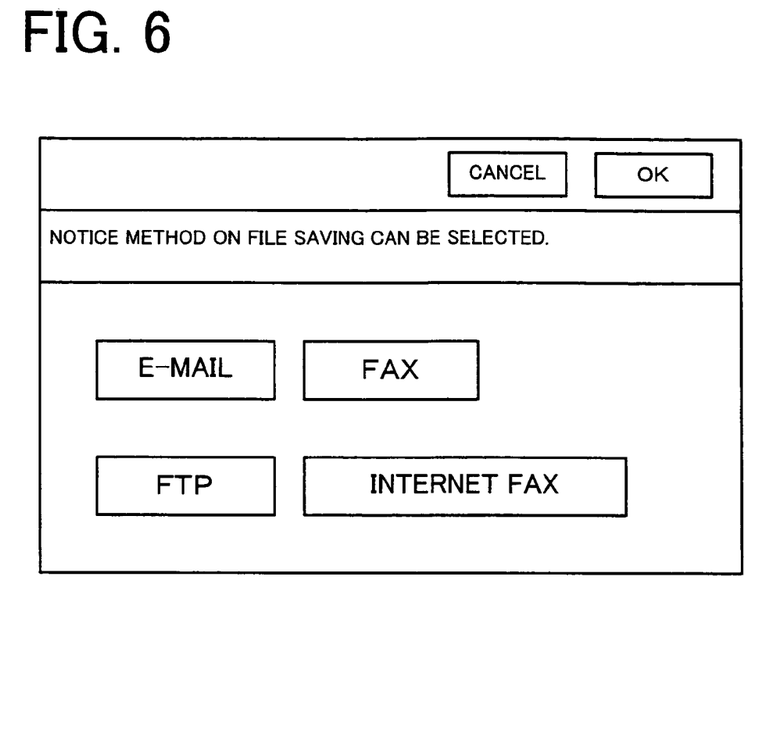
FIG. 6 is an example of display screen for setting notifying method.

When file-save processing to the file saving apparatus 2 starts, a user is asked to set notice method (S101). For example, a dialog box as shown in FIG. 6 is indicated on a display apparatus of a terminal with which a user takes file-save procedure. Looking at the dialog box, the user selects a notice method. According to FIG. 6, a notice method can be selected from e-mail, fax, FTP, and internet fax. Each of the file management apparatus is set to indicate appropriate choices depending on types of apparatuses connected to the network 3. A notice method selected by the user is recorded by the notice-method setting section 41 (FIG. 1) with being liked to a to-be-saved file.

Figure 7:
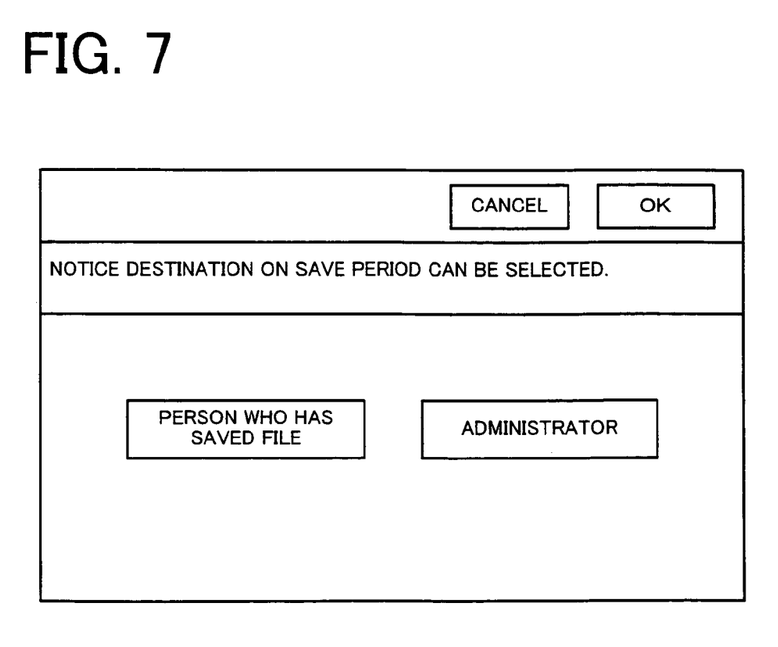
FIG. 7 is an example of display screen for setting a notice destination.

In the next step, the user is asked to set a notice destination (S102 in FIG. 2). A dialog box as shown in FIG. 7 is indicated on the user's terminal display. A notice destination selected by the user is recorded by the notice-destination setting section 42 (FIG. 1) with being linked to the to-be-saved file. Here, a user who has saved the file or a system administrator can be selected as notice destination. There may be indicated further more choices as notice destination. Alternatively, it may be possible for the user to set a notice destination other than the above by inputting a user name, a pass name, and the like. It may be also possible to set plural notice destinations for a single file save-period notice.

Figure 8:
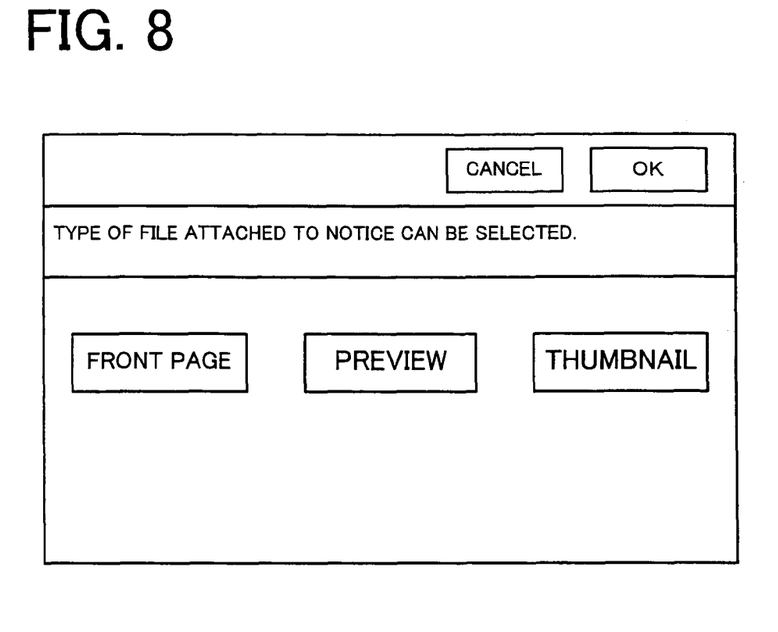
FIG. 8 is an example of display screen for selecting attachment file type.

In the next step, the user is asked to set a type of an attachment file (S103 in FIG. 2). A dialog box as shown in FIG. 8 is indicated on the user's terminal display. Here, there are provided three choices, namely, first page included in the subject file, preview, and thumbnail, and the user selects the most preferable type of attachment file from them. The type of an attachment file selected by the user is recorded by the attachment-file-type setting section 44 (FIG. 1) with being linked to the to-be-saved file. The attachment-file-type setting section 44 works as a partial-file-type setting section. It is possible to provide choices other than the indicated in FIG. 8. Alternatively, it is possible to provide a choice, "no attachment file". For example, in case a person other than a user who has saved a file is selected as notice destination, it may be set such that the notice destination be notified of a name of a person who has saved the file.

In the next step, the user is asked to decide setting method of save-period of a file (S104 in FIG. 2). That is, the user is asked to choose file-save-period management basing on time-related setting such as date setting or access-frequency-related setting. Although the flowchart of FIG. 2 indicates either one of the above setting methods should be chosen, it is also possible to use both of them. In that case, a notice may be made when earlier end of a save-period comes.

Figure 9:
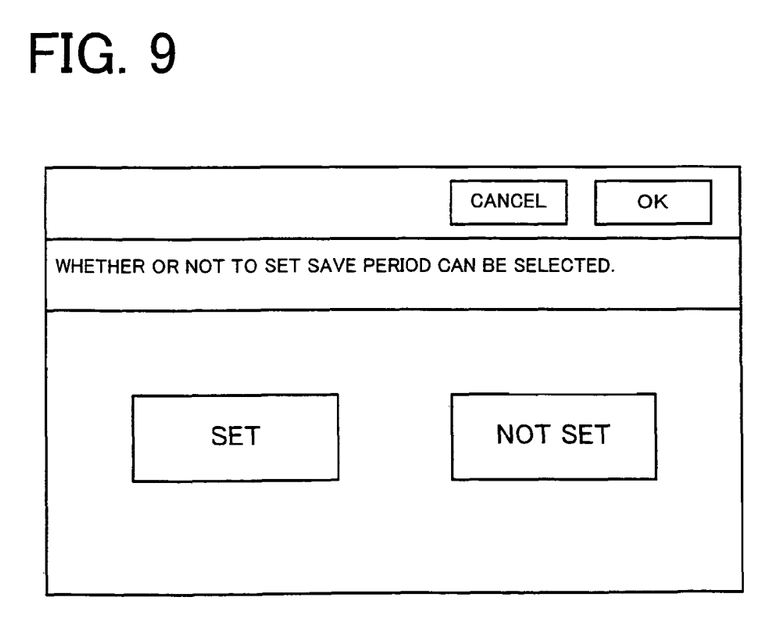
FIG. 9 is an example of display screen for selecting save-period-setting necessity.
Figure 10:
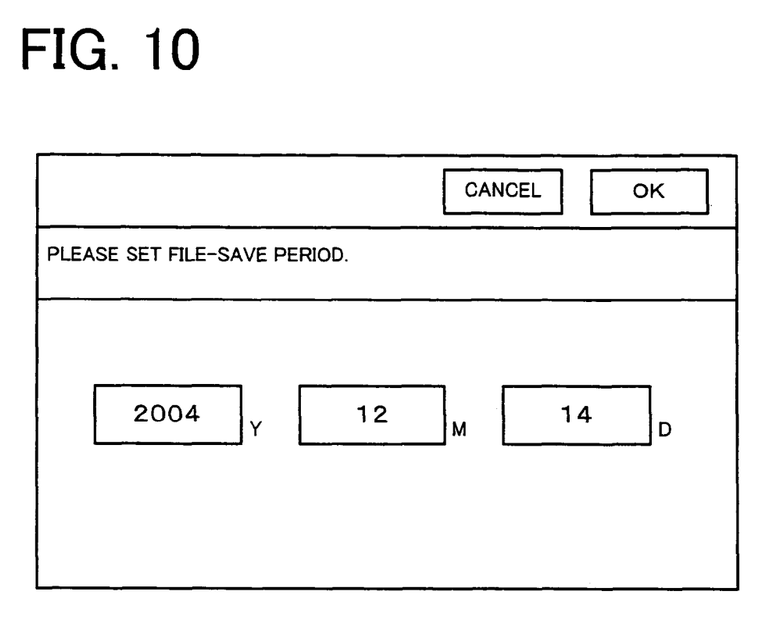
FIG. 10 is an example of display screen for setting and inputting a save period.

In case file management basing on time-related setting ("save-period management" at S104 in FIG. 2) is selected, the user is asked if he/she wants to set a save period (S105). For that purpose, a dialog box as shown in FIG. 9 is displayed on a screen of the user's terminal. In case the user makes a choice of setting a save-period (S105: YES in FIG. 2), an input for setting a save-period is requested (S106). Subsequently, a dialog box as shown in FIG. 10 is displayed. The user inputs a save-period, namely, year and date, using a keyboard and the like. A save-period set thereat is recorded by the save-period setting section 21 with being linked to a to-be-saved file.

Figure 11:
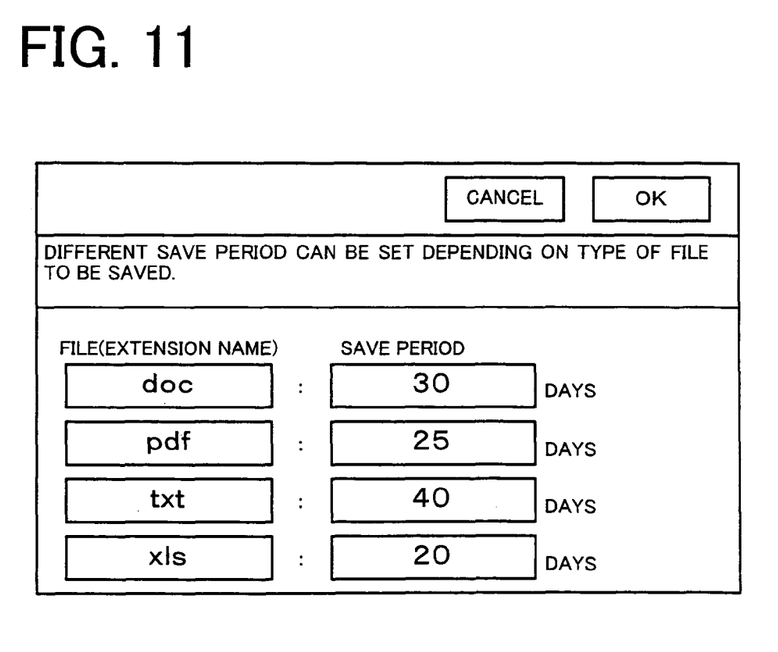
FIG. 11 is an example of display screen for setting save-period based on a default value.
Figure 12:
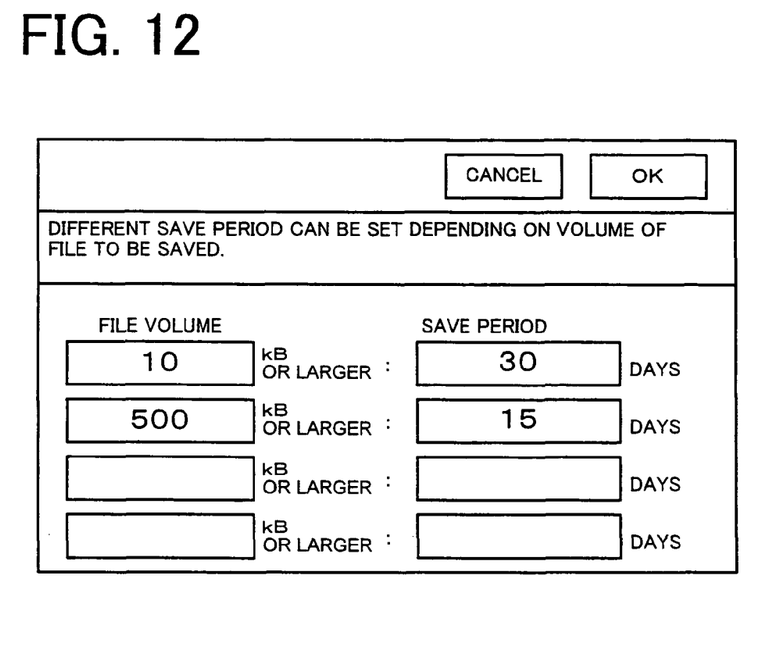
FIG. 12 is another example of display screen for setting save-period based on a default value.

Alternatively, in case the user makes a choice of not setting a save-period (S105: NO), a save-period indicated with a default value is applied (S107). The save-period indicated with a default value set thereat is recorded by the save-period setting section 21 with being linked to a to-be-saved file. A save-period of a default value is previously set by a system administrator and the like depending on type of file, volume of file, and the like. FIG. 11 shows an example of a display in which the administrator sets a save-period of a default value depending on type of file. Furthermore, FIG. 12 shows an example of a display for setting a save-period of a default value depending on volume of file. A system administrator and the like can set save-periods of default values by inputting appropriate values in those dialog boxes.

Thereby, a file to be managed with a save-period is given its save period at S106 or S107 in FIG. 2 and recorded. Save-period management is conducted for each saved file depending on a save-period set at S106 or S107. Then, it goes on to save-period management processing (S108).

Alternatively, in case file management basing on access state ("access management" at S104) is selected, the user is asked to select access management method (S109). In this embodiment, the user can select from access times, access frequency, and non-access period (time past since last access). In case the user makes a choice of file management basing on access times ("access times" at S109) setting of maximum access times is requested (S110). This is not to keep saving a file of which access times exceed its maximum access times in terms of security and the like.

In case file management basing on access frequency ("access frequency" at S109) is selected, the user is asked to set minimum access frequency (S111). Access frequency, i.e., a file of which access times during a predetermined counting period lowers its minimum times is no longer saved. For example, in cases there is one or less access time a day, it is regarded a save-period of the file terminates.

In case file management basing on non-access period ("non-access period" at S109) is selected, the user is asked to set a maximum non-access period (S112). A file of which non-access period exceeds its maximum is no longer saved. In case one of these access control methods is selected, any setting values of respective methods are recorded by the access-management setting section 31 with being linked to a to-be-saved file. Then, it goes on to access management processing (S113 in FIG. 2).

Next, there will be described save-period management processing routine. A file of which save-period is set by time is managed following the save-period management processing routine. In this routine, as shown in FIG. 3, the save-period counter 22 (FIG. 1) starts count upon start of file saving (S201). On the other hand, a notice date is calculated from a save-period and a notice timing set by the notice-timing setting section 43 (FIG. 1). The save-period monitoring section 23 (FIG. 1) monitors to compare a timer value of the save-period counter 22 and a notice date, and stands-by till coming of the notice date (S202: NO). When a timer value comes to the designated notice date (S202: YES), notice processing is conducted (S203).

Next, there will be described access management processing routine. When execution of this routine is started, the routine is branched off into three types depending on selected access management method as shown in FIG. 4 (S301). Access method has been selected by a user at S109 in FIG. 2.

In case management basing on access times ("access times" at S301 in FIG. 4) is selected, it is kept in stand-by state while there is no access (S302: NO). If any access (S302: YES), the access-management counter 32 (FIG. 1) counts up access times (S303) Then, the access-management monitoring section 33 (FIG. 1) compares the counted access times with maximum access times set previously (S304 in FIG. 4). In case it is not the maximum access times (S304: NO), stand-by state further lasts (S302) When the access times come to the maximum (S304: YES), it goes on to notice processing (S305).

In case management basing on access frequency ("access frequency" at S301) is selected, access frequency is calculated from access times in a predetermined counting period. Thereby, it is judged if the counting period terminates (S306). In case it does not terminate (S306: NO), the access-management monitoring section 33 (FIG. 1) monitors any access (S307). If any access (S307: YES), access times are counted up (S308) and the access-management monitoring section 33 keeps monitoring.

When a counting period terminates (S306: YES), access frequency is calculated (S309). Next, frequency calculated at S309 and minimum access frequency are compared (S310). In case the calculated frequency does not lower the minimum (S310: NO), count is cleared (S311). The access-management monitoring section 33 further keeps monitoring (S306). Contrarily, in case the frequency calculated at S306 lowers the minimum (S310: YES), it goes on to notice processing (S312).

In case management basing on non-access period ("non-access period" at S301) is selected, it is judged if any access to the saved file (S313). That is, the access-management monitoring section 33 (FIG. 1) monitors presence/absence of access. If any access (S313: YES), the timer is cleared (S314). If no access (S313: NO), the timer is counted up (S315). The value of the timer is compared with the maximum of non-access period (S316). In case the value does not exceed the maximum (S316: NO), the access-management monitoring section 33 further keeps on monitoring (S313). In case the timer exceeds the maximum (S316: YES), it goes on to notice processing (S317).

Next, there will be described notice processing by referring to FIG. 5. The notice processing shown in FIG. 5 is common to S203 in FIG. 3, S305, S312, and S317 in FIG. 4. When notice processing starts, a notice file is made. For making a notice file, notice method set at previous processing is obtained (S401). Next, notice-destination information is obtained (S402). Next, an attachment file set previously is selected (S403). Thereby, the attachment-file making section 45 (FIG. 1) makes an attachment file.

Figure 13:
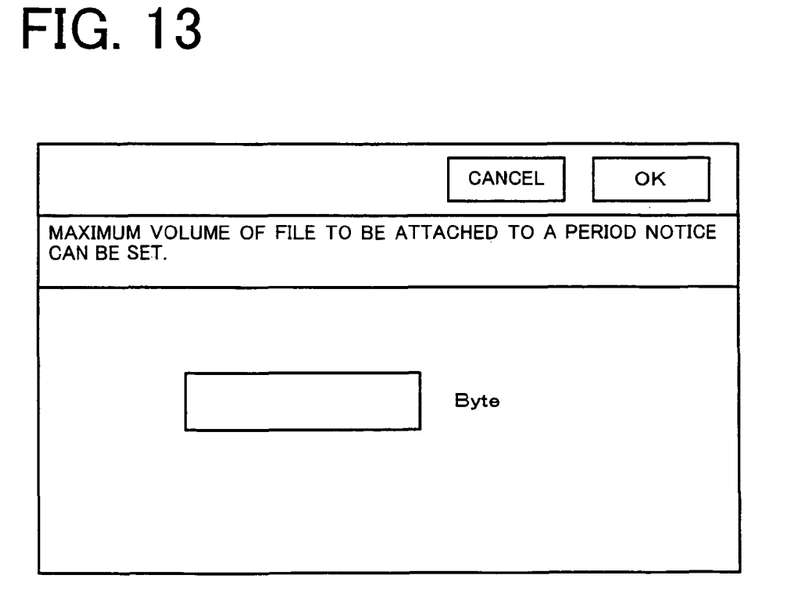
FIG. 13 is an example of display screen for setting an upper limit of file volume attached.

It is to be noted that the file management apparatus 1 can set a maximum value of attachment file's volume. This is because a notice file with too large volume is not preferable. Therefore, an administrator in charge of managing the file management apparatus 1 can set maximum volume of a file to be attached to a notice through a dialog box as shown in FIG. 13. Therefore, in the notice processing, an attachment file made at S403 is compared with maximum attachment file volume at S404.

In case an attachment file made at S403 exceeds its maximum volume (S404: YES), the attachment-file-type setting section 44 (FIG. 1) re-sets and selects another type of attachment file (S403). At this stage, the attachment-file-type setting section 44 works as partial-file-type-setting changing section. For example, in case a first page of a subject file has too large volume, the first page is replaced with another page. In case the number of preview images or thumbnails is too large, the number of images to be attached is reduced. Then, a new attachment file is made again by the attachment-file making section 45 (FIG. 1), so that attachment file volume is lowered than its maximum volume.

Next, a notice file is made by the notice-file making section 44 (FIG. 1), (S405). That is, a subject file name and notice destination(s) are inserted in a template of a notice file arranged depending on various notice method. Furthermore, an attachment file selectively made at S403 and a notice in which predetermined notice contents are included and linked together to form a notice file. The notice file thus made is transmitted to designated notice destination(s) by the notice transmitting section 47 (FIG. 1), (S406). That is all for the description of notice processing.

Figure 14:
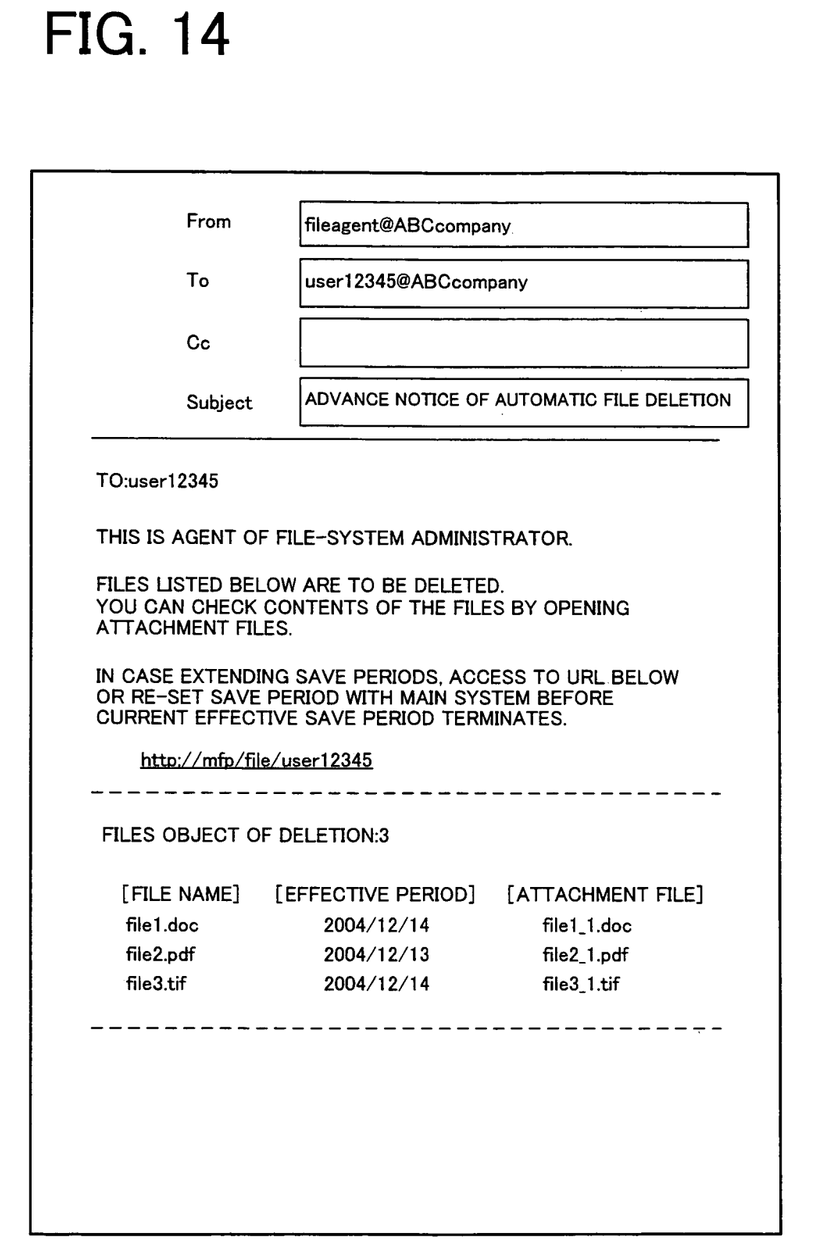
FIG. 14 is an example of an advance notice made by notice processing.

FIG. 14 shows an example of a notice. This is an example of a notice in a form of e-mail. A user can receive this notice e-mail with the user's personal computer 5 and the like. There are described name of file of which save-period is about to terminate and its effective save period in the notification. Furthermore, as an attachment file, a partial file of the subject file is attached. In case of a notice by fax, contents of the attachment file printed out follows the notice. Looking at the attachment file, a user can instantly recognize which file is subject to delete. Therefore, it is not necessary to look for a file so as to determined whether or not to extend a save period. Furthermore, there is no fear of wrongly recognize the subject file.

Figure 15:
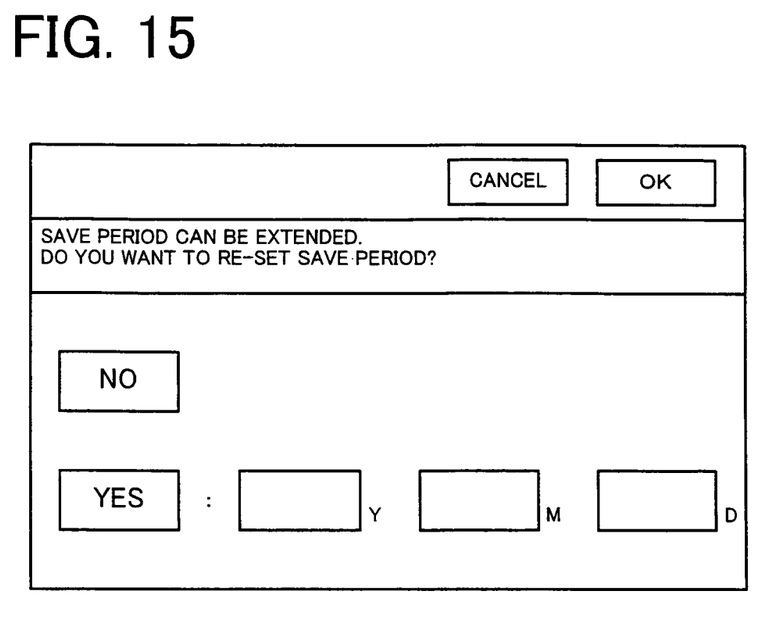
FIG. 15 is an example of display screen for extending a save period.

A user who receives the notice decides how to handle the file. For example, a save-period of the file can be extended. In case the save period is to be extended, the user selects "YES" and inputs a new save-period in a dialog box as shown in FIG. 15. Thereby, a save-period is re-set by the period re-setting section 51 (FIG. 1). Although FIG. 15 shows a manner of re-setting year and date, another manner of re-setting may be applicable. In case it is a file of which save-period has already been extended, details of renewal history may be indicated in FIG. 15. Furthermore, extension times of a save-period or an extension term may be restricted.

In case automatic deletion is selected, the user can respond to do so. Subsequently, automatic deletion is set by the automatic-deletion setting section 52. Alternatively, the user may just leave it undone without making a response. Thereby, automatic deletion is made by the file management apparatus 1 when a predetermined period comes. That is all for the description of management processing by the file management apparatus 1.

As described, the file management apparatus 1 directed to the present embodiment notifies a user of an automatic deletion notice before a subject file is automatically deleted. Furthermore, the notice by the file management apparatus 1 includes an attachment file which is a partial file of the subject file. Therefore, the user can readily and accurately recognize general contents of the subject file upon looking at the attached file. There is thus realized the file management apparatus 1 which enables a user who receives a save-period notice from system to identify the notified file readily and accurately.

Furthermore, it is preferable for the present invention to include a save-period setting section which sets a save period of each file and a notice-destination setting section which sets a notice destination of each file. With those composing elements, a save period and a notice destination different by file can be set, which is convenient.

Furthermore, it is preferable that the partial-file making section of the present invention makes a partial file corresponding to one of plural pages included in the subject file. By doing so, it readily reminds the user of the original file. Especially, a characteristic page and a frequently-accessed page are suitable for such type of file.

Furthermore, it is also preferable that the partial-file making section of the present invention makes a partial file corresponding to preview images of the file's contents. By doing so, the user can recognize general contents of the original file as image. Especially a diagram, a chart and the like are suitable to preview images, for the user to recall contents of the original file.

Furthermore, it is also preferable that the partial-file making section of the present invention makes a partial file corresponding to thumbnail images of the file. By doing so, the user can recognize reduction images of the original file. Especially, a reference, report and the like for presentation inclusive of image data are suitable to make into thumbnail images.

Furthermore, it is also preferable for the present invention to include a partial-file setting section which selects and sets type of attachment file from a page out of plural pages inclusive of the subject file, preview images of file's contents, and thumbnail images of file contents, and a partial-file making section which makes a partial file in accordance with setting by the partial-file setting section. By doing so, an appropriate type of an attachment file can be set and selected depending on contents and format of an original file.

Furthermore, it is also preferable for the present invention to include a notice-method setting section which sets notice method to a notice destination, and a notifying section which notifies a notice destination of the notice in accordance with notice method set by the notice-method setting section. By doing so, the notice destination (receiver) can receive a notice with favorable notice method such as e-mail, fax and the like. Therefore, a notice can reach a notice destination for sure.

Furthermore, it is also preferable for the present invention to include a partial-file-type-setting changing section which changes partial-file types in case volume of a partial file exceeds maximum volume. It is preferable that, in case setting by the partial-file-type setting section is changed, the partial-file making section remakes a partial file in accordance with setting change, and in case a partial file is remade, the partial-file attaching section attaches a remade partial file to a notice by the notifying section. With such composing elements, it prevents volume of a notice file from becoming too large. Too large volume of a notice-file transmission causes trouble for other jobs. In case of facsimile transmission, a large volume of file data takes many sheets of paper, which is unfavorable. In the present invention, in case volume of a partial file exceeds maximum volume, the partial-file-type-setting changing section changes setting of the partial-file-type setting section, which prevents an unnecessarily-large attached file from being made.

Furthermore, it is also preferable for the present invention to include a notice-timing setting section which sets notice timing by the notifying section, a save-period re-setting section which gives a notice destination an opportunity to re-set a file-save period when a notice by the notifying section reaches the notice destination, and an automatic-deletion setting section which sets whether or not a file be deleted automatically in accordance with a reply to a notice by the notifying section. With such composing elements, timing to notify a save-period notice can be set. Furthermore, since it is allowed to respond to a notice, a notice destination (receiver) can re-set to a save period to extend it for a while. Contrarily, by making a response of automatic deletion, the attachment file can be deleted automatically.

Meanwhile, the present embodiment is a just mere exemplification, never restricting the present invention to any particular one. Therefore, naturally the present invention may be improved or modified in various ways within a range not departing from the gist. For example a front page of file is applied as a choice of an attachment file in the present embodiment. However, an attachment file is not restricted to a front page. It is possible to allow a user to select a page to be attached. Alternatively, automatic selection is also possible depending on display state when a user gets access to the file. For example, it is applicable to attach a page frequently displayed. It is also applicable to attach a page last renewed.

In the present embodiment, a timer is used as a timing section. However, a timing section is not restricted to a timer but a typical clock may be applicable. In case a clock is used, a date and a save-period may be compared instead of comparison by a counter. Furthermore, a predetermined previous date for a save-period is assumed as notice timing in the present embodiment. Instead of previous notice, it is also possible to notify on the end of the save-period and a predetermined grace period may be added between the end of the save period and automatic deletion of file. Furthermore, the file management apparatus 1 is described as an independent body in the present embodiment. However, the file management apparatus 1 may incorporate the file saving apparatus 2 and the MFP 7. The file saving apparatus 2 may be a hard disk drive of the MFP 7.

That is, the above-mentioned file management apparatus may further incorporate a file saving apparatus, a scanner which employs well-known image taking method, and a printer which employs well-known image forming method such as electro-photographing method, inkjet method and the like. Furthermore, the inventive file management apparatus can be realized by executing software in which operations of respective elements composing the above file management apparatus are programmed on a computer connected to network. Furthermore, the inventive file management apparatus may be composed by combining hardware corresponding to each composing element or plural composing elements.

According to the present invention, there can be provided a file management apparatus, file management method, and file management program product with which a user who receives a file-saving related notice from system can readily and accurately grasp contents of the notified file.

What is claimed is:

1. A file management apparatus which manages files recorded in an electronic memory device, comprising:
 a timer section;
 a save-period monitoring section which monitors a coming to a preset end of a save period for each file in accordance with timing by the timer section, wherein the file is deleted at the end of the save period;
 a notice-destination setting section which associates each file with a selected one of a plurality of notice destinations whereby each file is linked to at least one notice destination;
 a partial-file making section which makes a single partial file composed of partial contents of a single file, wherein the file comprises a plurality of pages, and the partial file consists of a single page of the respective file, wherein the single page is one of a page of the file that has been accessed most frequently, or a page of the file that has been most recently renewed;
 a notifying section which notifies an associated one of said plurality of notice destinations during the save-period of a fact that there is a linked file of which the save period is coming to the preset end; and
 a partial-file attaching section which attaches a partial file of the file to a notice by the notifying section.

2. A file management apparatus according to claim 1 further comprising:
 a save-period setting section which sets a save period of each file; and
 wherein said notice-destination setting section sets a notice destination of each file.

3. A file management apparatus according to claim 1, wherein the partial-file making section makes a partial file out of one of plural pages included in a file.

4. A file management apparatus according to claim 1, wherein the partial-file making section makes a partial file out of a preview image of a file.

5. A file management apparatus according to claim 1, wherein the partial-file making section makes a partial file out of a thumbnail image of a file.

6. A file management apparatus according to claim 1 further comprising a partial-file-type setting section which sets which type of a partial file is attached to a notice among one of plural pages included in a file, a preview image of a file, and a thumbnail image of a file,
 wherein the partial-file making section makes a partial file in accordance with setting done by the partial-file-type setting section.

7. A file management apparatus according to claim 6 further comprising a partial-file-type-setting changing section which changes setting done by the partial-file-type setting section in case volume of a partial file exceeds maximum volume,
 wherein in case setting done by the partial-file-type setting section is changed, the partial-file making section remakes a partial file in accordance with setting after change, and
 in case a partial file is remade, the partial-file attaching section attaches a remade partial file to a notice by the notifying section.

8. A file management apparatus according to claim 1 further comprising a notice-method setting section which sets notice method to a notice destination,
wherein the notifying section conducts notice to a notice destination in accordance with notice method set by the notice-method setting section.

9. A file management apparatus according to claim 1 further comprising:
 a notice-timing setting section which sets notice timing by the notifying section;
 a save-period re-setting section which gives a notice destination an opportunity to re-set a file-save period when a notice by the notifying section reaches the notice destination; and
 an automatic-deletion setting section which sets whether or not a file be deleted automatically in accordance with a reply to a notice by the notifying section.

10. A file management apparatus according to claim 1 further comprising a scanner and a printer.

11. A computer implemented file management method for managing files comprising:
 a notice-destination setting step for selectively associating each of a plurality of files to be recorded in a recording apparatus with a corresponding one of a plurality of notice destinations whereby each of said plurality of files is linked to a corresponding one of said plurality of notice destinations;
 a save period checking step for checking whether or not a preset end of a save period comes with respect to a file which has been recorded in a recording apparatus and of which save period has been set, wherein the file is deleted at the end of the save period;
 a partial-file making step for making a single partial file composed of partial contents of a single file for which an end of a save period comes, wherein the file comprises a plurality of pages, and the partial file consists of a single page of the respective file, wherein the single page is one of a page of the file that has been accessed most frequently, or a page of the file that has been most recently renewed; and
 a notifying step for notifying an associated one of said plurality of notice destinations of a fact that there is a linked file of which save period is coming to the preset end and for sending a partial file of the file to the one notice destination during the save period.

12. The computer implemented file management method according to claim 11 further comprising:
 a save-period setting step for setting a save period of each file to be recorded in a recording apparatus; and
 wherein said notice-destination setting step sets a notice destination of each file to be recorded in a recording apparatus.

13. The computer implemented file management method according to claim 11 further comprising a partial-file-type setting step for setting which type of partial file is used as a partial file among one of plural pages included in a file, a preview image of a file, and a thumbnail image of a file,
 wherein in the partial-file making step, a partial file is made in accordance with setting at the partial-file-type setting step.

14. The computer implemented file management method according to claim 13 further comprising:
 a partial-file-type-setting changing step for accepting change of partial-file types in case volume of a partial file exceeds maximum volume; and
 a partial-file remaking step for remaking a partial file in accordance with changed setting in case partial-file-type setting is changed at the partial-file-type-setting changing step, wherein, in case a partial file is remade, a remade partial file is transmitted in the notifying step.

15. The computer implemented file management method according to claim 11 further comprising a notice-method setting step for setting notice method to a notice destination,
wherein in the notifying step, transmission of a notice and a partial file to a notice destination is conducted in accordance with notice method set at the notice-method setting step.

16. The computer implemented file management method according to claim 11 further comprising:
a notice-timing setting step for setting timing to execute the notifying step; and
an automatic-deletion setting step for setting whether or not a file be deleted automatically in accordance with a reply to a notice at the notifying step,
wherein, in the notifying step, an opportunity to re-set a file-save period is given to a notice destination.

17. The computer implemented file management method according to claim 11, wherein one of plural of pages included in a file is used as a partial file in the partial-file making step.

18. The computer implemented file management method according to claim 11, wherein a preview image of file is used as a partial file in the partial-file making step.

19. The computer implemented file management method according to claim 11, wherein a thumbnail image of a file is used as a partial file in the partial-file making step.

20. A file management program product residing on a computer readable medium which makes a computer execute following:
a notice-destination setting process for selectively associating each of a plurality of files to be recorded with a corresponding one of a plurality of notice destinations whereby each of said plurality of files is linked to a corresponding one of said plurality of notice destinations;
a save period checking process for checking whether a preset end of a save period is approaching with respect to a file which has been recorded in a recording apparatus and of which save period has been set, wherein the file is deleted at the end of the save period;
a partial-file making process for making a single partial file composed of partial contents of a single file for which an end of a save period comes, wherein the file comprises a plurality of pages, and the partial file consists of a single page of the respective file, wherein the single page is one of a page of the file that has been accessed most frequently, or a page of the file that has been most recently renewed; and
a notifying process for notifying one of a plurality of notice destinations of a fact that there is a linked file of which the end of the save period is approaching and for sending a partial file of the file to the one notice destination during the save period.

21. A file management apparatus which manages files recorded in a recording apparatus, comprising:
a notice-destination setting section which associates each file with a selected one of a plurality of notice destinations whereby each file is linked to at least one notice destination;
a timer section;
a calculating section which calculates a notice date for each file in accordance with a preset save-period of each file whereby the notice date occurs during the save period, wherein the file is deleted at the end of the save period;
a notice-date monitoring section which monitors coming of a notice date for each file in accordance with timing by the timer section;
a partial-file making section which makes a single partial file composed of partial contents of a single file, wherein the file comprises a plurality of pages, and the partial file consists of a single page of the respective file, wherein the single page is one of a page of the file that has been accessed most frequently, or a page of the file that has been most recently renewed;
a notifying section which notifies corresponding linked notice destinations before a preset end of a save period for each file when there is a file of which a notice date comes; and
a partial-file attaching section which attaches a partial file of the file to a notice by the notifying section.

22. A computer implemented file management method for managing files, comprising:
a notice-destination setting step for selectively associating each of a plurality of files with a corresponding one of a plurality of notice destinations whereby each of said plurality of files is linked to a corresponding one of said plurality of notice destinations;
a notice-date setting step for setting a notice date of each of said files which have been recorded in a recording apparatus and of which a save period of a file is preset, wherein the file is deleted at the end of the save period;
a notice-date monitoring step for monitoring coming of a notice date for each file;
a partial-file making step for making a single partial file composed of partial contents of a single file of which a notice date comes, wherein the file comprises a plurality of pages, and the partial file consists of a single page of the respective file, wherein the single page is one of a page of the file that has been accessed most frequently, or a page of the file that has been most recently renewed; and
a notifying step for notifying corresponding linked notice destinations before a preset end of a save period for each file and for sending a partial file of the file to the corresponding linked notice destinations during the save period.

* * * * *